United States Patent [19]

Sekiguchi

[11] Patent Number: 4,633,341
[45] Date of Patent: Dec. 30, 1986

[54] TAPE ADDRESS ADJUSTING APPARATUS FOR VIDEO TAPE RECORDER

[75] Inventor: Toru Sekiguchi, Tokyo, Japan

[73] Assignee: NEC Corporation, Japan

[21] Appl. No.: 619,858

[22] Filed: Jun. 12, 1984

[30] Foreign Application Priority Data

Jun. 13, 1983 [JP] Japan .............................. 58-105321

[51] Int. Cl.$^4$ ............................................ G11B 15/52
[52] U.S. Cl. ...................................................... 360/73
[58] Field of Search ........................................ 360/73

[56] References Cited

U.S. PATENT DOCUMENTS

| | | | |
|---|---|---|---|
| 4,267,564 | 5/1981 | Flores | 360/72.3 |
| 4,288,823 | 9/1981 | Yamamoto et al. | 360/73 |
| 4,358,798 | 11/1982 | Hedlund et al. | 360/73 |
| 4,394,694 | 7/1983 | Ninomiya et al. | 360/14.3 |
| 4,450,490 | 5/1984 | Fujii et al. | 360/13 |
| 4,507,691 | 3/1985 | Ishiguro et al. | 360/14.3 |

Primary Examiner—George G. Stellar
Attorney, Agent, or Firm—Ostrolenk, Faber, Gerb & Soffen

[57] ABSTRACT

A tape synchronizing apparatus for synchronizing tape addresses corresponding to tape locations of a tape which is being played back and reference addresses produced in the apparatus. The apparatus includes a capstan for rotating the tape at a controllable speed and a circuit for producing the tape addresses. The tape address generator circuit includes a circuit for detecting the direction of movement of the tape being played back, a shaping circuit for detecting a control signal from the tape which indicates each successive address and an up-down counter for producing the actual tape addresses. The reference addresses are produced in a reference address counter. The reference addresses are produced and updated at a rate corresponding to the frequency of a frequency reference. The clock rate of the frequency reference is adjustable by means of a frequency dividing circuit. The reference addresses and the tape addresses are compared and an acceleration or deceleration signal to the capstan driving means of the tape is generated for synchronizing the tape addresses with the reference addresses.

8 Claims, 1 Drawing Figure

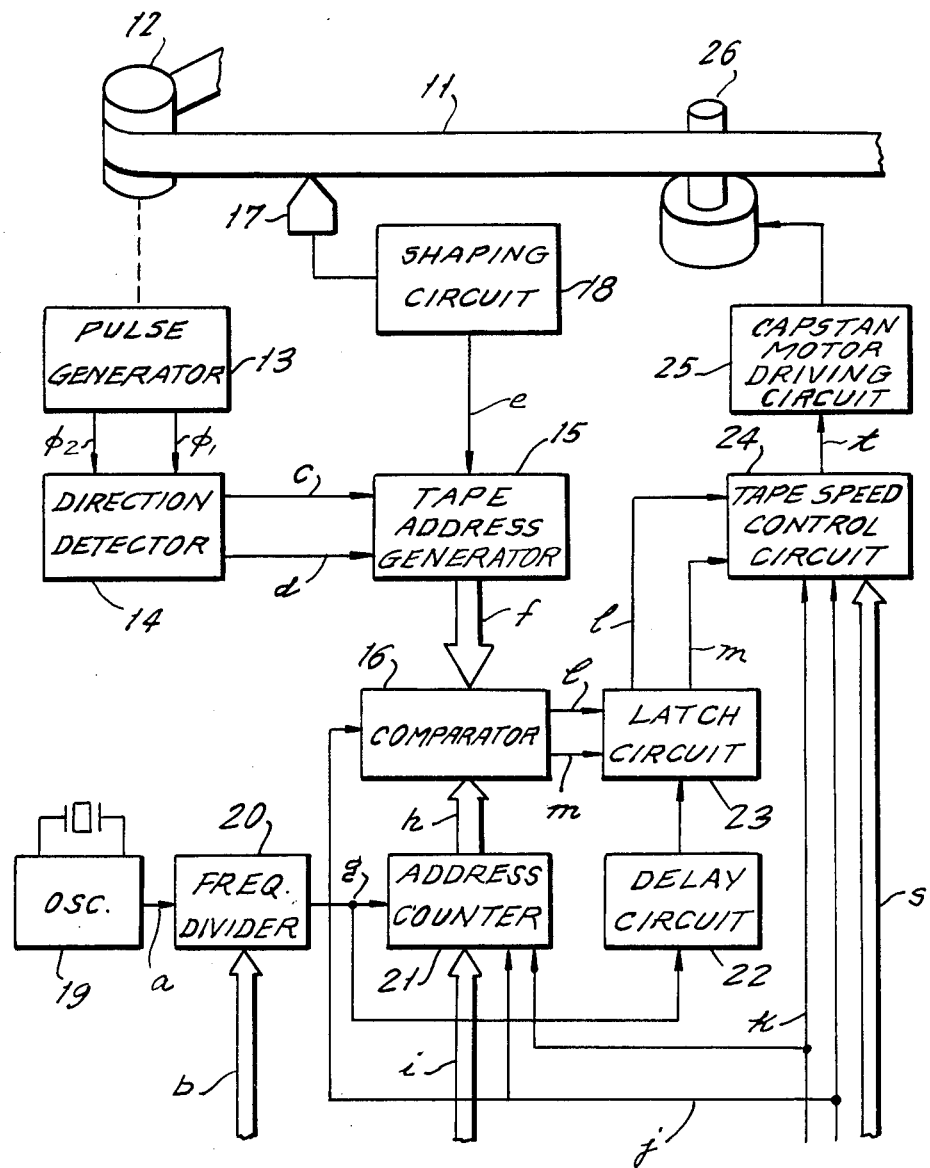

TAPE ADDRESS ADJUSTING APPARATUS FOR VIDEO TAPE RECORDER

BACKGROUND OF THE INVENTION

This invention relates to a video tape recorder (VTR) and, more particularly, to a tape address synchronizing apparatus for a VTR which synchronizes a tape address of the VTR to a predetermined address at a certain point.

When a video program recorded on a magnetic tape which is mounted on a playing VTR is to be edited into another magnetic tape located on a recording VTR, both VTRs rewind backward their respective magnetic tapes by a predetermined time (pre-roll time) from the edit point, and then, both VTRs turn on in the normal (forward) direction. In this manner, the two magnetic tapes are synchronized and the editing is begun at a desired point on the tape. During the pre-edit role, the speeds of one or both VTRs are controlled to align or synchronize the respective tapes. Accordingly, the tape addresses of both VTRs must be synchronized with each other during the pre-roll time. Such a tape address adjusting or synchronizing technique is disclosed in the U.S. patent application entitled "Tape Address Synchronizing Apparatus for Video Tape Recorder" which corresponds to Japanese Patent Application No. 58-90175 filed on May 23, 1983.

Recently, such synchronizing VTRs have also been used for producing special images such as still images, slow motion images and quick motion images. In an editing operation, however, where it is necessary to edit a program which includes a special image, a problem arises because the playing VTR is operated at a special speed corresponding to the special images (i.e., the playing VTR is operated at a slow speed while the recording VTR is operated at the normal speed so as to record a slow motion image). In this case, the pre-roll time provided to the playing VTR is different from that provided to the recording VTR. For example, when the playing VTR runs at 1/7 times normal speed to deliver the slow motion image, and the pre-roll time for the recording VTR is seven seconds, the pre-roll time of the playing VTR would be only one second. Furthermore, the updating rate of the tape address in the playing VTR is 1/7 the updating rate of the tape address in the recording VTR. Since a conventional tape address synchronizing apparatus is usable only when both the playing VTR and the recording VTR are operated at their normal speeds, the conventional tape address synchronization apparatus cannot be used to synchronize the tape address to a predetermined address with the required accuracy. By using the conventional apparatus, frame error of the tape address is generated by the tape address synchronizing apparatus. Therefore, with the apparatus of the prior art, accurate editing is not possible when the playing VTR is operated at a different speed, especially at a slow speed, such as when the slow motion images are recorded.

SUMMARY OF THE INVENTION

It is, therefore, an object of the present invention to provide a tape address synchronizing apparatus for a VTR which is capable of synchronizing a tape address of a play back VTR to an edit point even when a video program is to be edited into a recording VTR is reproduced in slow motion.

In accordance with the foregoing, the present invention comprises tape address signal producing means for producing an actual tape address signal in accordance with the speed of a tape past a tape head; means for generating a first clock signal having a fixed frequency; frequency dividing means for frequency-dividing said first clock signal to produce a second clock signal, the dividing ratio of said frequency dividing means being modified in response to a reference tape speed signal; reference address signal producing means for producing a reference address signal by counting said second clock signal; means for comparing said actual tape address signal with said reference address signal to deliver a tape speed control signal in response to the comparison result; and capstan driving means for rotating a capstan driving said tape at a speed determined by said tape speed control signal.

The present invention further comprises tape address producing means for producing an actual tape address signal in accordance with the speed at which a tape moves past a tape head; means for producing a reference clock signal, the frequency of said reference clock signal being modified in response to a tape transportation speed signal; reference address producing means for producing a reference address signal by counting said reference clock signal; means for comparing said actual tape address signal with said reference address signal and for generating a tape speed control tape as a function of said comparison and a tape running direction signal; and capstan driving means for rotating a capstan at a speed corresponding to said tape speed control signal.

The foregoing objects of the present invention are also achieved by providing a tape synchronizing apparatus comprising means for moving a tape past a tape head; means for generating an actual tape address signal indicative of the position of said tape relative to said tape head as said tape is moved past said tape head; means for generating a reference tape address signal indicative of the desired position of said tape relative to said tape head as a function of an adjustable reference tape speed signal applied thereto whereby the rate of change of said reference tape address signal varies as a function of said reference tape speed signal; and means for adjusting the speed at which said moving means moves said tape past said tape head as a function of the difference between said actual and reference tape address signals.

BRIEF DESCRIPTION OF THE DRAWING

The FIGURE shows schematically an enbodiment according to the present invention.

DETAILED DESCRIPTION OF THE PREFERRED EMBODIMENT

Referring to the FIGURE there is shown an embodiment of the present invention in which a magnetic tape 11 is wound on about 120° of the circumference of a timer roller 12. Translational movement of the magnetic tape 11 rotates the timer roll 12. A two-phase pulse generator 13 generates two-phase pulses $\phi_1$ and $\phi_2$ having a frequency proportional to the rotational frequency of the timer roller 12. When the magnetic tape 11 travels forward in the normal direction, the pulse $\phi_1$ is advanced by 90° of phase relative to the pulse $\phi_2$, and when the magnetic tape 11 runs backward relative to the normal direction, the pulse $\phi_1$ is delayed by 90° of phase relative to the pulse $\phi_2$. Both pulses $\phi_1$ and $\phi_2$ have a rate or frequency of 1920 P.P.S., when the magnetic tape 11 runs at the normal speed.

The pulses $\phi_1$ and $\phi_2$ from the pulse generator 13 are applied to a direction detector 14, which discriminates the phase relation between them and generates a direction signal d. This direction signal d is applied to a tape address generator 15 including a frequency divider and a equalizer. Furthermore, the direction detector 14 adjusts the timing of the pulse $\phi$ so that its phase is delayed with respect to the transition of the direction signal d, and delivers it to the tape address generator 15. The tape address generator 15 receives the clock pulse c, the direction signal d and a control track pulse (CTL) signal e (described below), and produces a tape address signal f, by counting the clock pulse c which is supplied to a comparator 16. On the other hand, the CTL signal e of the frame period recorded on the magnetic tape 11 is reproduced by the playback head 17 and is amplified and shaped by a shaping circuit 18. Thereafter, the signal e is applied as an equalizing signal to the tape address generator 15. By using this CTL signal e, the tape address signal (counted value) f as the result of counting by the frequency divider is synchronized with the frame timing of a video signal recorded on the magnetic tape (equalization).

In this embodiment, the play back tape speed may be set anywhere from zero (still) to two times the normal play back speed, and can be set at 1/16 increments of a frame within this range. Accordingly, the minimum unit of the tape address signal f produced by counting is set to the 1/16 frame in order to prevent a drop of regulation accuracy even when the tape running speed falls to a low speed to prolong the interval of the tape address updating, and the number of times of comparison in the comparator 16 decreases. Assuming, for example, the minimum unit of the tape address signal f is one frame as in the prior art, then the time interval between comparisons in the comparator 16 increases 16 times, and in other words, the accuracy of the speed control drops to 1/16 when the play back tape is run at a speed of 1/16 times the normal reproducing speed. On the other hand, since the minimum unit of the tape address signal f is set to the 1/16 frame according to the embodiment of the present invention, the accuracy obtained according to the prior art by running the play back tape at the normal play back speed can be obtained even when the play back tape is run at the speed of 1/16 times the normal speed. This means that the accuracy of speed control which is 16 times higher than the prior art can be obtained with the embodiment of the present invention. In effect, one obtains increased address resolution in that the tape address f and a reference address h (that is described shortly) are resolved to 1/16 of a frame. Or, the actual tape address signal and the reference address signal have minimum units which divide one frame period into plural time sections.

A crystal oscillator 19 generates a 4,032 KHz clock signal a and applies it to a programmable frequency divider 20. The programmable frequency devider 20 receives the clock signal a and a frequency division ratio signal b from a control unit (not shown), and delivers the result of frequency division as a reference clock signal g to a counter 21 and to a delay circuit 22. The operation of the programmable frequency divider 20 will be described, hereinafter. The frequency of the reference clock signal g delivered from the frequency divider 20 is varied in response to the frequency division ratio signal b corresponding to the tape running speed, and the cycle period of the reference clock signal g is set equal to a time interval equal to the time it takes for the recording to run for a 1/16 frame length on the magnetic tape. Therefore, the programmable frequency divider 20 divides the signal clock a by 8,400 at the normal tape speed. Assuming now that the tape running speed of the play back tape is set to 1/16 times the normal tape speed, the time interval while the tape runs for the 1/16 frame length corresponds to the time interval while the tape runs for one frame length at the normal tape speed, and is about 33.4 ms in the case of the NTSC signal. This cycle period of 33.4 ms can be obtained by frequency-dividing the signal clock a by 134,400. Similarly, when the tape running speed is set to $\frac{1}{4}$ times the normal tape speed, the time interval while the tape runs for the 1/16 frame length is about 8.3 ms, and this period of 8.3 ms is obtained by frequency-dividing the signal clock a by 33,600 in the programmable frequency divider 20. In this manner, the frequency of the reference clock signal g delivered from the frequency divider 20 as controlled by the frequency division ratio signal b such that the least significant unit of the tape address signal f delivered from tape address generator 15 is equal to the transitional period of the reference clock signal g. As is clear from the foregoing, the frequency division ratio signal b is indicative of the presumed speed of the play back tape. As such, this signal is more generally a reference tape speed signal.

A counter 21, consisting of an up/down counter, produces a reference address h by counting the reference clock signal g in response to a run start signal k. In the counter 21, the counted value (the reference address h) is updated from an initial address value signal i, and the updating direction i.e., up-counting or down-counting is controlled by a tape running direction set signal j. The reference address signal h, the run start signal k, the initial address value signal i and the tape running direction set signal j are supplied from a control unit (not shown).

The actual tape address signal f, the reference address signal h and the running direction set signal j are applied to a comparator 16. The comparator 16 compares the tape address signal f with the reference address signal h and delivers the comparison result to a latch circuit 23. The comparison result is delivered as an acceleration signal l and a deceleration signal m. The comparator 16 delivers the acceleration signal or the deceleration signal depending upon the tape running direction set signal j, as shown in a following table.

TABLE

| Tape running direction set signal j | Tape address: Reference address, f:h | Acceleration signal l | Deceleration signal m |
|---|---|---|---|
| "L" (forward) | f > h | x | o |
|  | f = h | x | x |
|  | f < h | o | x |
| "H" (reverse) | f > h | o | x |
|  | f = h | x | x |
|  | f < h | x | o | o: signal is produced
x: signal is not produced

In the table above, for example, the deceleration signal m is produced when the tape running direction set signal j indicates the forward direction ("L") and the tape address signal f is greater than the reference address h. The acceleration signal l is produced when the tape running direction set j indicates the reverse direction ("H") and the tape address signal f is greater than the reference address h.

The acceleration signal l and the deceleration signal m delivered from the comparator 16 are applied to the latch circuit 23. In a delay circuit 22, the reference clock signal g is delayed by the time corresponding to the delay time of the counter 21 and comparator 16 to supply the delayed reference clock signal g to the latch circuit 23. Therefore, in the latch circuit 23, the output signals l and m from the comparator 16 are held for a period corresponding to one period of the reference clock signal g, and, after this, applied to a speed control circuit 24.

The speed control circuit 24 has the basic function of applying a driving control signal t to a capstan motor driving circuit 25 in response to the run start signal k, the tape running direction set signal j and a running speed set value S, which are supplied from the control unit. The capstan motor driving circuit 25 causes the magnetic tape 11 to run at a speed corresponding the running speed set value S, under the control of the driving control signal t. In addition to the basic function described above, the speed control circuit 24 modifies the driving control signal t such that the magnetic tape 11 runs at a speed about 10% faster than the running speed set value S when the acceleration signal l is applied to the speed control circuit 24. Simularly, the speed control circuit 24 modifys the driving control signal t such that the magnetic tape 11 runs at a speed about 10% slower than the set value S when the deceleration signal m is applied to the speed control circuit 24. In this manner, when the tape address signal f is not coincident with the reference address signal h, the running speed of the magnetic tape 11 is changed so that they coincide with each other, that is, the actual tape address is adjusted to the predetermined point indicated by the reference address.

As described above, according to the present invention, the tape address synchronizing apparatus, which includes the reference clock generator whose frequency is controlled in response to the tape running speed and the reference address counter which counts the reference clock signal, is obtained. Accordingly, high accuracy tape address synchronization is achieved even when the magnetic tape is run at different speeds such as a slow motion play back mode. When a slow motion video image is edited, therefore, the present invention makes it possible to achieve accurate editing without errors. This is achievable because the magnetic tapes on the play back and recording VTRs are accurately synchronized at the predetermined edit point.

What is claimed is:

1. A tape address synchronizing apparatus for a video tape recorder comprising:
   tape address signal producing means for producing an actual tape address signal in accordance with the speed that a tape moves past a tape head, said actual tape address signal having an address resolution effective to divide each frame period of a video signal associated with said video tape recorder into a plurality of time sections;
   means for generating a first clock signal having a fixed frequency;
   frequency dividing means for frequency-dividing said first clock signal to produce a second clock signal, the dividing ratio of said frequency dividing means being capable of being modified in response to a reference tape speed signal;
   reference address signal producing means for producing a reference address signal by counting said second clock signal, said reference address signal having an address resolution effective to divide each said frame period of a video signal associated with said video tape recorder into a plurality of time sections;
   means for comparing said actual tape address signal with said reference address signal to deliver a tape speed control signal in response to the comparison result; and
   capstan driving means for rotating a capstan driving said tape at a speed determined by said tape speed control signal.

2. A tape address adjusting apparatus as claimed in claim 1, wherein said tape speed control signal is an acceleration signal when said tape address signal is delayed with respect to said reference address signal and is a deceleration signal when said tape address signal is ahead of said reference address signal.

3. A tape address adjusting apparatus for a video tape recorder comprising:
   tape address producing means for producing an actual tape address signal in accordance with the speed that a tape moves past a tape head, said actual tape address signal having an address resolution effective to divide each frame period of a video signal associated with said video tape recorder into a plurality of time sections;
   means for producing a reference clock signal, the frequency of said reference clock signal being modified in response to a tape transportation of time sections;
   reference address producing means for producing a reference address signal by counting said second clock signal, said reference address signal having an address resolution effective to divide each said frame period into a plurality of time sections;
   means for comparing said actual tape address signal with said reference address signal and for generating a tape speed control signal as a function of both said comparison and a tape running direction signal; and
   capstan driving means for rotating a capstan at a speed corresponding to said tape speed control signal.

4. A tape synchronizing apparatus, comprising:
   means for moving a tape past a tape head;
   means for generating an actual tape address signal indicative of the position of said tape relative to said tape head as said tape is moved past said tape head, said actual tape address signal having an address resolution effective to divide each frame period associated with a video signal of said apparatus into a plurality of time sections;
   means for generating indicative of the desired position of said tape relative to said tape head as a function of an adjustable reference tape speed signal applied thereto, said reference tape address signal having an address resolution which is effective to divide each said frame period of a video signal associated with said apparatus into a plurality of time sections, whereby the rate of change of said reference tape address signal varies as a function of said reference tape speed signal; and
   means for adjusting the speed at which said moving means moves said tape past said tape head as a function of the difference between said actual and reference tape address signals.

5. A tape synchronizing apparatus as claimed in claim 4, wherein said means for generating a reference tape address signal comprises:

oscillating means for generating an oscillating signal having a predetermined frequency;

frequency divider means for dividing the frequency of said oscillating signal as a function of said reference tape speed signal;

address counter means responsive to both said frequency divided oscillating signal and to an initial address value signal to generate said reference tape address signal.

6. The tape synchronizing apparatus as claimed in claim 4, wherein said means for moving a tape past a tape head comprises a capstan and wherein said means for adjusting the speed at which said moving means moves said tape past said record head comprises:

comparator means for comparing said actual and reference tape address signals and for generating at least one output signal indicating whether said actual address signal is equal to, less than, or greater than said reference tape address signal; and means responsive to at least one said output signal for causing said capstan to rotate at a speed which attempts to cause said tape to move past said tape head at a speed determined by said reference tape address signal.

7. The tape synchronizing apparatus as claimed in claim 4, wherein said means for generating an actual tape address signal comprises:

means for generating first and second pulse trains whose frequency and relative phase are indicative of the speed and direction that said tape moves past said tape head;

a shaping circuit for generating a pulsed output signal each time a tape address mark associated with said tape passes a predetermined location; and a counter for producing said actual tape address signal as a function of said first and second pulse trains and said pulsed output signal.

8. A tape address adjusting apparatus for a video tape recorder, comprising:

a tape head reading means for reading out a control track pulse signal from a control track recorded on a video tape;

timer roller means associated with said tape for producing a pulse train having a frequency corresponding to a tape speed of said tape;

tape address signal producing means responsive to said control track pulse signal and said pulse train for producing an actual tape address signal, said actual tape address signal having an address resolution which is effective to divide each frame period associated with a video signal recorded on said tape into a plurality of time sections;

clock oscillation means for generating a first clock signal having a fixed frequency;

frequency-dividing means for dividing the frequency of said first clock signal to produce a second clock signal, the dividing ratio of said frequency-dividing means being settable by a tape speed command signal;

reference address signal producing means for producing a reference address signal by counting said second clock signal, said reference address signal having an address resolution effective to divide said frame period into a plurality of time sections;

comparing means for comparing said actual tape address signal to said reference tape address signal and for delivering a tape speed control signal in response to the result of said comparison; and capstan driving means for rotating a capstan at a speed corresponding to said tape speed control signal, wherein the rotational speed of said capstan is controllable on the basis of said comparison result to a speed having a resolution comparable to that of said address resolution.

* * * * *